United States Patent [19]
Arora

[11] Patent Number: 6,115,808
[45] Date of Patent: Sep. 5, 2000

[54] METHOD AND APPARATUS FOR PERFORMING PREDICATE HAZARD DETECTION

[75] Inventor: Judge K. Arora, Cupertino, Calif.

[73] Assignee: Intel Corporation, Santa Clara, Calif.

[21] Appl. No.: 09/224,205

[22] Filed: Dec. 30, 1998

[51] Int. Cl.$^7$ .................................. G06F 9/38; G06F 9/22
[52] U.S. Cl. ........................... 712/219; 712/224; 712/210
[58] Field of Search .................................. 708/706, 576, 708/708; 712/233, 47, 234, 235, 237, 239, 23, 210, 217, 224, 219; 710/260

[56] References Cited

U.S. PATENT DOCUMENTS

| | | | |
|---|---|---|---|
| 5,659,722 | 8/1997 | Blaner et al. | 712/234 |
| 5,809,294 | 9/1998 | Ando | 712/233 |
| 5,859,999 | 1/1999 | Morris et al. | 712/224 |

*Primary Examiner*—Daniel H. Pan
*Attorney, Agent, or Firm*—David J. Kaplan

[57] ABSTRACT

Performing hazard detection using status and mask vectors. Predicate status and mask vectors are generated. From the predicate status vector it is determined if a predicate is pending, and from the predicate mask vector it is determined if the predicate is needed.

23 Claims, 3 Drawing Sheets

METHOD AND APPARATUS FOR PERFORMING PREDICATE HAZARD DETECTION

The present invention relates to computer systems and more particularly to detecting hazards in the execution of instruction sequences that use predication.

BACKGROUND

Computer systems, from small handheld electronic devices to medium-sized mobile and desktop systems to large servers and workstations, are becoming increasingly pervasive in our society. Computer systems typically include one or more processors. A processor manipulates and controls the flow of data in a computer by executing instructions. Increasing the speed at which instructions are executed tends to increase the computational power of the computer. Processor designers employ many different techniques to increase processor speed to create more powerful computers for consumers. One such technique is to implement a pipeline in a processor.

A pipeline is an assembly line for instructions. When an instruction is issued to a processor pipeline, the instruction is progressively processed through separate stages in the pipeline. At any given moment, the pipeline may contain many instructions, each at different stages of processing at different stages in the pipeline. In this manner, processor resources are better utilized, thereby increasing instruction execution throughput by the processor.

The execution of one instruction in a pipeline may depend on the execution of one or more previously issued instructions. If data from a first instruction in a pipeline is needed by a second instruction in the pipeline, then the unavailability of the data from the first instruction causes a delay in the execution of the second instruction. In such a case, a portion of the pipeline may need special processing, such as being halted, or stalled, until the first instruction completes execution so the resulting data can be used by the second instruction. This condition is called a hazard.

For example, consider the following set of instructions:

load X→R1 add R1+R2→R3

Proper execution of the add instruction depends on proper execution of the load instruction because the add instruction requires the data in register R1 as an operand, and the load instruction must first load this data into R1. Unfortunately, the result of the load instruction may not be ready by the time the add instruction is ready to use it. Consequently, execution of the add instruction must be delayed until the load instruction is completed. This is known as a read after write (RAW) hazard because the add instruction must read register R1 after the load instruction writes to register R1.

Now consider the following set of instructions:

load X→R1 add R2+R3→R1

Proper execution of the add instruction no longer depends on the load instruction because the target of the load instruction, R1, is not an operand of the add instruction. R1 is, however, the target of the add instruction, and subsequent instructions that read from register R1 expect R1 to contain the sum of R2+R3 rather than the data loaded by the load instruction. Unfortunately, the load instruction may take longer to execute than the add instruction. Consequently, execution of the add instruction may need to be delayed until the load instruction is completed so that the load instruction does not overwrite its return data in place of R2+R3 in register R1. This is known as a write after write (WAW) hazard because the add instruction must write to register R1 after the load instruction writes to R1.

SUMMARY OF THE INVENTION

A method and apparatus are described for performing hazard detection using status and mask vectors. In accordance with one embodiment of the present invention, predicate status and mask vectors are generated. From the predicate status vector it is determined if a predicate is pending, and from the predicate mask vector it is determined if the predicate is needed.

Other features and advantages of the present invention will be apparent from the accompanying drawings and the detailed description that follows.

BRIEF DESCRIPTION OF THE DRAWINGS

The present invention is illustrated by way of example and not limitation in the figures of the accompanying drawings in which like references indicate similar elements and in which.

DETAILED DESCRIPTION

In accordance with one embodiment of the present invention, a hazard detection circuit includes first and second memory regions coupled to a logic circuit. The first memory region stores a predicate status vector including predicate status bits. Each status bit of the status vector indicates whether or not its associated predicate is pending (i.e. not ready) or not pending (i.e. ready). A predicate mask vector is then generated (and may additionally be stored) including predicate mask bits. Each mask bit of the mask vector indicates whether or not its associated predicate is needed by a particular consumer instruction.

The logic circuit detects the occurrence of predicate hazards for a consumer instruction by comparing the predicate status vector to the predicate mask vector. A hazard signal is sent if, based on this comparison, a predicate is determined to have a status of pending and is determined to be needed by the consumer instruction. For one embodiment of the present invention, this comparison and determination is accomplished by first ANDing the bits of the predicate status vector with corresponding bits of the predicate mask vector to create a resulting vector, and then ORing the bits of this resulting vector with each other.

In response to the hazard signal, all or at least the portion of a processor pipeline containing the consumer instruction is stalled until the hazard is resolved by, for example, the predicate becoming ready. A more detailed description of embodiments of the present invention, including various configurations and implementations, is provided below.

Figure 1:
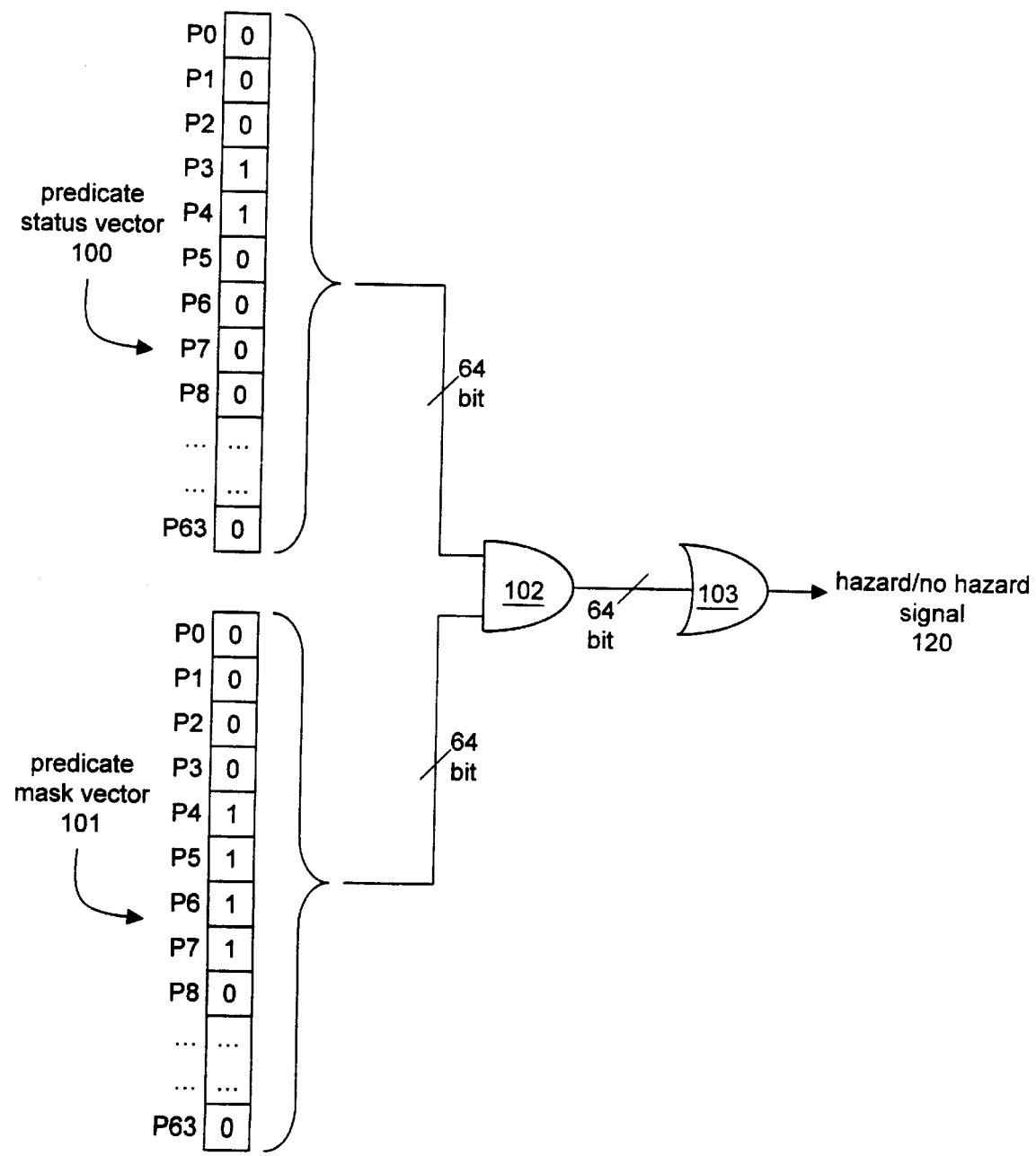
FIG. 1 is a circuit formed in accordance with an embodiment of the present invention.

FIG. 1 is a hazard detection circuit formed in accordance with an embodiment of the present invention. The circuit includes a first memory region storing predicate status vector 100 and a second memory region storing predicate mask vector 101. Although the first and second memory regions are physical structures that store the vector data, the terms predicate status vector and predicate mask vector may be used to refer to the first memory region and second memory region, respectively, in which the vectors are stored. The two memory regions are coupled to a logic circuit comprising AND gate 102 and OR gate 103. AND gate 102 includes a first set of inputs coupled to predicate status vector 100 and a second set of inputs coupled to predicate mask vector 101. The output of AND gate 102 is coupled to the input of OR gate 103, and the output of OR gate 103 is hazard/no hazard signal line 120.

To explain the operation of the hazard detection circuit of FIG. 1, consider the following set of instructions executed by a processor in accordance with one embodiment of the present invention:

compare R6=R7→P3, P4
move from predicates P4 P5 P6 P7→R8
(P4) add R1+R4→R5

The nomenclature used herein will be defined in reference to these instructions. The compare instruction is a producer instruction with respect to the move and add instructions. The compare instruction produces (i.e. writes to) predicates P3 and P4. The status of predicates P3 and P4 is "pending" when the compare instruction begins execution. The status of these predicates becomes "ready" when the predicate values (either true or false) become available to subsequent consumers of the predicates. For example, the status of P4 changes from pending to ready when the value of predicate P4 becomes available for use by the move instruction. For one embodiment of the present invention, the status of a predicate becomes ready when the value of the predicate will be available to an executing consumer instruction by the time the consumer instruction needs the value.

Note that as used herein, the contents of a register (such as an integer, floating point, or general purpose register of a register file) may be referred to as a register value or, simply, register. Similarly, the contents of a predicate register of a predicate register file may be referred to as a predicate value or, simply, predicate.

Based on the comparison of the values in registers R6 and R7, the values for compare instruction predicates P3 and P4 are determined. If the register value of R6 (i.e. the value stored in register R6) is equal to the register value of R7, then the value of predicate P3 is true, and the value of predicate P4 (the compliment of P3) is false. Otherwise, the value of P3 is false, and P4 is true. Note that other types of compare instructions may be used to determine predicate values. For example, a compare instruction may set the value of one or more predicates based on one register value being greater than, equal to, or less than another register value.

The move instruction writes the values of predicates P4, P5, P6, and P7 the values stored at corresponding positions of register R8 (e.g. the 4th, 5th, 6th, and 7th bit positions of register R8). The move instruction is a consumer of predicates P4, P5, P6, and P7 and is both a consumer and producer of register R8. Note that an instruction may be a consumer instruction with respect to a previously issued producer instruction, and a producer instruction with respect to a subsequently issued consumer instruction.

In general, an instruction that reads a predicate is a consumer of that predicate. An instruction that writes a predicate is a consumer of that predicate with respect to previous instructions and a producer of that predicate with respect to subsequent instructions. As used herein, a predicate or register is "needed" by a consumer instruction if, when executed, the consumer instruction reads from, writes to, or otherwise consumes or uses the predicate or register. For example, predicates P3 and P4 are needed by the compare instruction, and predicates P4, P5, P6, and P7 are needed by the move instruction.

P4 is the qualifying predicate of the add instruction. Predicate P4 predicates the execution of the add instruction on the value of P4. For example, if the value of P4 is false, the add instruction is not executed or is treated as a no-op such that the instruction is not used to update the architectural state of the register file. If P4 is true, the add instruction is executed. The add instruction is a consumer of P4 because the add instruction reads the value of P4 to determine whether or not the instruction is executed. Therefore, predicate P4 is needed by the add instruction.

To ensure that the value of P4, as consumed by the move instruction, is the result of the compare instruction, the RAW hazard on P4 must be properly resolved between the compare and move instructions. If the compare instruction takes longer to execute than the move instruction, the move instruction is stalled in the processor pipeline until the compare instruction completes execution. For a processor having an in-order execution engine, the stalling of an instruction in the processor pipeline causes the stalling of subsequent instructions in the pipeline. For a processor having an out-of-order execution engine, the stalling of an instruction in the processor pipeline may not affect the processing of subsequent instructions.

In accordance with one embodiment of the present invention, predicate status is represented in the hazard detection circuit of FIG. 1 as a single status bit for each predicate. For example, for one embodiment, a predicate having a status bit of "1" indicates that the predicate is pending, and a status bit of "0" indicates that the predicate is ready. Similarly, the need for a predicate may be represented as a single mask bit for each predicate per consumer instruction. For example, a predicate having a mask bit of "1" indicates that the predicate is needed by the associated consumer instruction, and a mask bit of "0" indicates that the predicate is not needed. For an alternate embodiment of the present invention, the status and need information may be represented by alternately defined bits.

Upon executing the compare instruction of the set of instructions discussed above, the predicate status vector 100 of FIG. 1 is updated. The predicate status bits associated with the predicate IDs of producer predicates P3 and P4 are updated to indicate that the predicates are pending. When the compare instruction completes execution, predicate status vector 100 is again updated by changing the predicate status bits associated with predicates P3 and P4 to indicate that the predicates are ready. For one embodiment of the present invention, completion of execution of a producer instruction that produces a predicate may not necessarily indicate that the newly calculated predicate value has been stored in its associated predicate register. Instead, execution of such an instruction may be deemed sufficiently "complete" when the predicate value will be available to an executing consumer instruction by the time the consumer instruction needs the value.

In accordance with one embodiment of the present invention, the memory region in which predicate status vector 100 of FIG. 1 is stored comprises 64 lines of memory, each line storing at least a single status bit and being indexed by an associated predicate ID. For one embodiment, predicate status vector 100 is accessed by a demultiplexer having its control input controlled by the predicate IDs of producer predicates of producer instructions. For an alternate embodiment of the present invention, a predicate status vector may include any number of predicate status bits associated with a corresponding number of available predicate IDs.

Referring again to the set of instructions discussed above, predicate mask vector 101 of FIG. 1 is generated upon executing the move instruction. The predicate mask bits associated with the predicate IDs of consumer predicates P4, P5, P6, and P7 are set to a value indicating that the predicates are needed, and the remaining mask bits are set to a value indicating that the associated predicates are not needed by the move instruction.

In accordance with one embodiment of the present invention, the memory region in which predicate mask vector 101 of FIG. 1 is stored comprises 64 lines of memory, each line storing at least a single mask bit and being indexed by an associated predicate ID. For one embodiment, predicate mask vector 101 is accessed by a demultiplexer having its control input controlled by the predicate IDs of consumer predicates of consumer instructions. For an alternate embodiment of the present invention, a predicate mask vector may include any number of predicate status bits associated with a corresponding number of available predicate IDs. For another embodiment of the present invention, predicate mask vector 101 and predicate status vector 100 are combined in a single table indexed by a single set of predicate IDs having separate columns for status bits and mask bits.

Predicate status vector 100 and predicate mask vector 101 of FIG. 1 are both provided to the input of AND gate 102. Status vector 100 is ANDed with mask vector 101 by ANDing each status bit with each mask bit having the same predicate ID. For this embodiment of the present invention, AND gate 102 includes one two-input AND gate for each predicate ID. For example, AND gate 102 calculates the AND of the status bit of P0 with the mask bit of P0, the status bit of P1 with the mask bit of P1, the status bit of P2 with the mask bit of P2, etc. The output of AND gate 102 is an intermediate result that, for one embodiment of the present invention, has the same number of bits as there are predicate IDs.

The intermediate result that is output from AND gate 102 is provided to the input of OR gate 103 of FIG. 1. The intermediate result is ORed by applying the logical OR function to each bit of the intermediate result to generate a single output hazard/no hazard signal 120. This signal may then be used to control stalls of a pipeline within a processor. Alternatively, this signal may be used to perform other actions such as pipeline flushing.

For example, for the embodiment of FIG. 1 as applied to the set of instructions discussed above, AND gate 102 determines the logical AND of 0·0 for P0, 0·0 for P1, 0·0 for P2, 1·0 for P3, 1·1 for P4, 0·1 for P5, 0·1 for P6, 0·1 for P7, 0·0 for P8, etc. The intermediate result that is output from AND gate 102 is, therefore, 0 for P0, 0 for P1, 0 for P2, 0 for P3, 1 for P4, 0 for P5, 0 for P6, 0 for P7, 0 for P8, etc. OR gate 103 then determines the logical OR of 0+0+0+0+1+0+0+0+0, etc., and generates the result of "1".

Note that after the compare instruction begins execution, but before it completes execution, predicate P4 has a status bit of "1." Predicate P4 also has a mask bit of "1" in the predicate mask vector associated with the move instruction. Thus, predicate P4 is both pending and is needed by the consumer (move) instruction, resulting in a final value of "1" for hazard/no hazard signal 120 as determined by the hazard detection circuit of FIG. 1. This signal indicates the presence of a hazard, and the portion of the processor pipeline containing the move instruction may be stalled until the compare instruction completes execution. Once the compare instruction completes execution, the status bit associated with predicate P4 is updated to "0", and, as a result, the hazard/no hazard signal changes to "0", indicating that the hazard has been removed. In response, instruction flow through the pipeline resumes.

Therefore, the hazard detection circuit of FIG. 1 determines whether or not a pending predicate is needed by a particular consumer instruction. If a pending predicate is needed, a hazard signal is provided at the output of OR gate 103. If, instead, none of the predicates are both pending and needed, a no hazard signal is provided at the output of OR gate 103.

For an alternate embodiment of the present invention, the logic circuit of FIG. 1 comprising AND gate 102 and OR gate 103 may be replaced with an alternate logic circuit that achieves the same result. For example, for one embodiment, AND gate 102 may be replaced with an OR gate having inverting inputs, and OR gate 103 may be replaced with a NAND gate. For another embodiment, the predicate status bits and predicate mask bits are defined in an inverted manner, necessitating appropriate modifications to the logic circuit.

One advantage of the hazard detection circuit of FIG. 1 is that it very rapidly determines whether or not a predicate hazard exists even if there are multiple predicates produced or consumed by a single producer or consumer instruction. The use of predicate status and mask vectors in this manner accommodates broadside instructions, such as "move from predicates" and "move to predicates" instructions, that read or write, respectively, many predicates at once.

Figure 2:
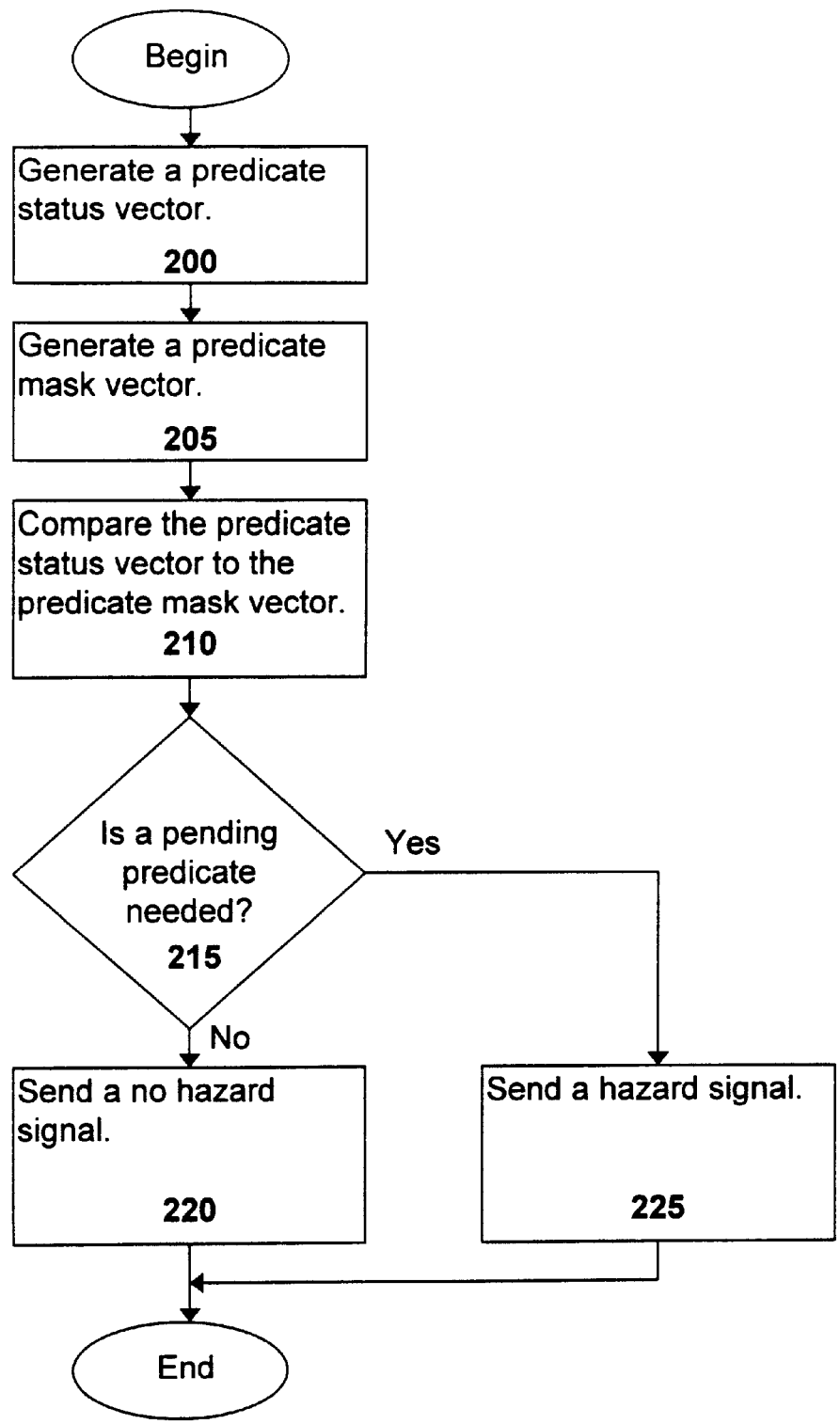
FIG. 2 is a flow chart showing a method of the present invention.

FIG. 2 is a flow chart showing a method of the present invention. At step 200, a predicate status vector is generated and stored in a memory region within a processor. For one embodiment of the present invention, this status vector is generated by updating a predicate status vector with predicate status information from a predicate producer instruction. At step 205, a predicate mask vector is generated and stored in a memory region within the processor.

At step 210 of FIG. 2, the predicate status vector is compared to the predicate mask vector. For one embodiment of the present invention, this comparison involves ANDing the predicate status vector with the predicate mask vector to generate an intermediate result, and ORing the intermediate result.

At step 215 of FIG. 2, it is determined whether or not a predicate is both pending, due to, e.g., uncompleted execution of the producer instruction that writes the predicate, and needed by a consumer instruction that writes or reads the predicate. If it is determined that a pending predicate is needed, then a hazard signal is sent at step 225. Otherwise, a no hazard signal is sent at step 220.

Figure 3:
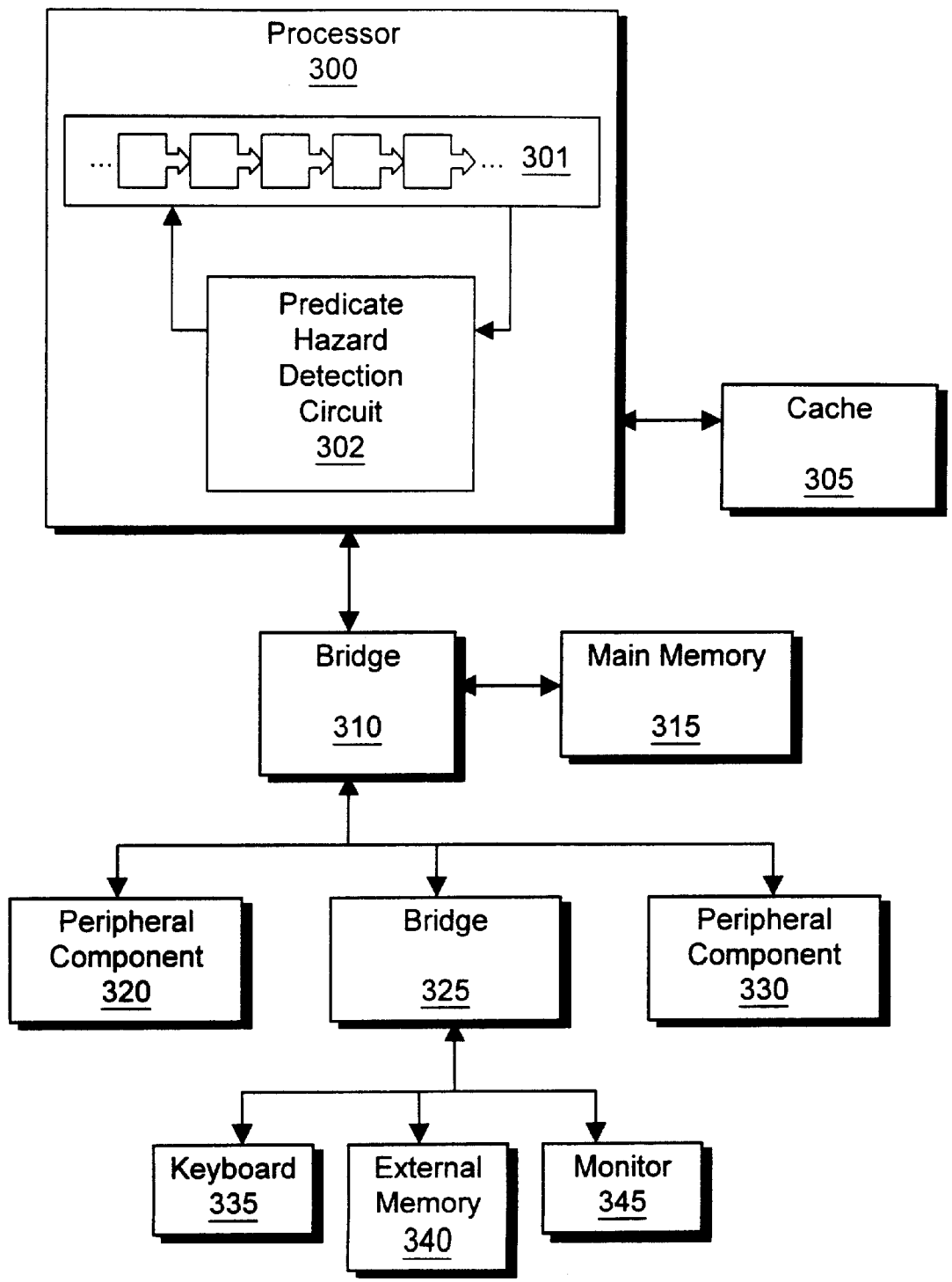
FIG. 3 is a computer system formed in accordance with an embodiment of the present invention.

FIG. 3 is a computer system formed in accordance with an embodiment of the present invention. Processor 300 includes pipeline 301 coupled to hazard detection circuit 302. Cache 305 and bridge 310 are coupled to processor 300. Bridge 310 is used to couple processor 300 to main memory 315 and to peripheral components 320 and 330. Bridge 325 couples keyboard 335, external memory 340, and monitor 345 to bridge 310.

Peripheral components 320 and 330 of FIG. 3 may include audio and video input/output devices such as audio/video generators, accelerators, or analyzers. External memory 340 may include a hard drive, floppy disk, tape drive, other magnetic storage media, a battery powered random access memory (RAM) device, an electrically programmable read only memory (EPROM) storage device, other solid-state storage device, a CD-ROM, or other non-volatile, machine-readable, storage medium.

A sequence of instructions is stored in external memory 340 of FIG. 3, including a producer instruction that produces a predicate and a consumer instruction that consumes a predicate. When the computer system of FIG. 3 is activated, processor 300 transfers the instructions from external memory 340 into main memory 315 via bridges 325 and 310. The instruction may then be transferred to cache 305 before being executed by processor 300. Execution of the producer instruction causes processor 300 to generate a predicate status vector associated with the producer instruction. Execution of the consumer instruction causes processor 300 to generate a predicate mask vector associated with the consumer instruction. In accordance with one embodiment of the present invention, either the producer, consumer, or both instructions produce or consume more than two predicates.

For one embodiment of the present invention, predicate hazard detection circuit 302 compares the predicate status vector to the predicate mask vector. If it is determined that a pending predicate is needed by the consumer instruction, the hazard detection circuit sends a hazard signal to pipeline 301. Otherwise, hazard detection circuit 302 sends a no hazard signal to pipeline 301. In response to receiving a hazard signal, control circuitry within pipeline 301 stalls the execution of the consumer instruction until the hazard is removed (i.e. until the pending predicates needed by the consumer instruction are ready). In response to receiving a no hazard signal, instruction flow and execution within pipeline 301 proceeds normally.

This invention has been described with reference to specific exemplary embodiments thereof. It will, however, be evident to persons having the benefit of this disclosure that various modifications and changes may be made to these embodiments without departing from the broader spirit and scope of the invention. The specification and drawings are, accordingly, to be regarded in an illustrative rather than a restrictive sense.

What is claimed is:

1. A method of hazard detection comprising:
   generating a predicate status vector;
   generating a predicate mask vector;
   determining if a predicate is pending according to the predicate status vector and is needed according to the predicate mask vector sending a hazard signal in response to determining that the predicate is both pending and needed;
   updating the predicate status vector upon completion of a producer instruction; and
   sending a no hazard signal in response to determining that the predicate is either no longer pending or no longer needed.

2. The method of claim 1, further comprising stalling at least a portion of a processor pipeline in response to sending the hazard signal.

3. The method of claim 1, further comprising flushing at least a portion of a processor pipeline in response to sending the hazard signal.

4. The method of claim 1, further comprising sending a no hazard signal if it is determined that a plurality of predicates associated with the predicate status vector and the predicate mask vector are either ready or not needed.

5. The method of claim 1, wherein the producer instruction writes a predicate.

6. The method of claim 1, wherein the producer instruction writes a plurality of predicates.

7. The method of claim 1, wherein the producer instruction is a write instruction.

8. The method of claim 1, wherein determining includes ANDing the predicate status vector with the predicate mask vector to create an intermediate result.

9. The method of claim 8, wherein determining includes ORing the intermediate result.

10. A method of predicate hazard detection comprising:
    comparing a first predicate status bit associated with a first predicate ID of a predicate status vector to a first predicate mask bit associated with the first predicate ID of a predicate mask vector to generate a first signal;
    comparing a plurality of predicate status bits associated with a plurality of predicate IDs of the predicate status vector to a plurality of predicate mask bits associated with the plurality of predicate IDs of the predicate mask vector to generate a plurality of signals;
    sending a hazard signal if the first signal indicates that a predicate is both pending and needed; and
    sending a no hazard signal if the first signal or any of the plurality of signals indicates that a predicate is either not pending or not needed.

11. The method of claim 10, wherein comparing includes ANDing the predicate status vector with the predicate mask vector to create an intermediate result.

12. The method of claim 11, further comprising ORing the intermediate result to generate a hazard/no hazard signal.

13. A processor comprising:
    a first memory region to store at least a portion of a predicate status vector;
    a second memory region to store at least a portion of a predicate mask vector; and
    a logic circuit, coupled to the first and second memory regions, to compare the portion of the predicate status vector to the portion of the predicate mask vector and to provide a hazard signal if a predicate is determined to be both pending and needed and to provide a no hazard signal if all predicates associated with both the portion of the predicate status vector and the portion of the predicate mask vector are determined to be either ready or not needed.

14. The processor of claim 13, wherein the logic circuit includes a first AND gate having one input coupled to a first location in the first memory region associated with a first predicate ID, and a second input coupled to a second location in the second memory region associated with the first predicate ID, the first AND gate to AND a status bit to be stored in the first location with a mask bit to be stored in the second location.

15. The processor of claim 14, wherein the logic circuit includes an OR gate having an input coupled to an output of the first AND gate, the OR gate to OR the output of the first AND gate with the output of a second AND gate, the second AND gate to AND a status bit to be stored in a third location of the first memory region associated with a second predicate ID with a mask bit to be stored in a fourth location of the second memory region associated with the second predicate ID.

16. The processor of claim 13, wherein an output of the logic circuit is coupled to a pipeline of the processor, at least a portion of the pipeline to stall upon receiving the hazard signal.

17. A multiprocessor computer system comprising:
    a processor; and
    a memory having stored therein a set of instructions that, when executed by the processor, cause the processor to:
    generate a predicate status vector and a predicate mask vector;

compare the predicate status vector to the predicate mask vector;

send a hazard signal if a pending predicate is needed;

update the predicate status vector upon completion of a producer instruction; and send a no hazard signal if the predicate is either no longer pending or no longer needed.

18. The system of claim 17, wherein the processor includes a pipeline, and the instructions further cause at least a portion of the pipeline to stall in response to the hazard signal.

19. The system of claim 17, wherein the instructions further cause the processor to generate a no hazard signal if a plurality of predicates common to both vectors are either not pending or not needed.

20. The system of claim 17, wherein the set of instructions includes a single instruction that produces more than two predicates.

21. The system of claim 17, wherein the set of instructions includes a single instruction that consumes more than two predicates.

22. The system of claim 17, wherein the instructions further cause the processor to AND the predicate status vector with the predicate mask vector to generate an intermediate result, and to OR the intermediate result to generate a hazard/no hazard signal.

23. The system of claim 17, wherein the memory is an external memory.

* * * * *